(12) United States Patent
Kuo et al.

(10) Patent No.: US 12,517,299 B2
(45) Date of Patent: Jan. 6, 2026

(54) OPTOELECTRONIC DEVICE AND METHOD OF TRANSMITTING OPTICAL SIGNAL

(71) Applicant: Advanced Semiconductor Engineering, Inc., Kaohsiung (TW)

(72) Inventors: Hung-Chun Kuo, Kaohsiung (TW); Jung Jui Kang, Kaohsiung (TW); Chiu-Wen Lee, Kaohsiung (TW); Shih-Yuan Sun, Kaohsiung (TW); Chang Chi Lee, Kaohsiung (TW); Chun-Yen Ting, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 349 days.

(21) Appl. No.: 18/105,702

(22) Filed: Feb. 3, 2023

(65) Prior Publication Data
US 2024/0264368 A1   Aug. 8, 2024

(51) Int. Cl.
*G02B 6/12*   (2006.01)
*H04B 10/25*   (2013.01)

(52) U.S. Cl.
CPC ........... *G02B 6/12004* (2013.01); *G02B 2006/12109* (2013.01); *H04B 10/25891* (2020.05)

(58) Field of Classification Search
CPC .............................. G02B 6/12; G02B 6/12004
See application file for complete search history.

(56) References Cited

U.S. PATENT DOCUMENTS

| 7,991,248 | B2 | 8/2011 | Matsuoka et al. | |
|---|---|---|---|---|
| 8,165,433 | B2* | 4/2012 | Jenkins | G02B 6/3596 385/125 |
| 2009/0003761 | A1* | 1/2009 | Matsuoka | G02B 6/42 385/14 |
| 2011/0222814 | A1* | 9/2011 | Krill | G02B 6/12004 385/24 |

FOREIGN PATENT DOCUMENTS

CN   101506705 B   7/2011

* cited by examiner

*Primary Examiner* — Tina Wong
(74) *Attorney, Agent, or Firm* — FOLEY & LARDNER LLP

(57) ABSTRACT

An optoelectronic device is provided. The optoelectronic device includes a plurality of first waveguides and a plurality of second waveguides. The plurality of first waveguides are configured to receive a first plurality of optical signals. The plurality of second waveguides are configured to transmit a second plurality of optical signals. The plurality of first waveguides extend substantially along a first direction and the plurality of second waveguides extend substantially along a second direction different from and non-parallel with the first direction.

12 Claims, 19 Drawing Sheets

OPTOELECTRONIC DEVICE AND METHOD OF TRANSMITTING OPTICAL SIGNAL

BACKGROUND

1. Field of the Disclosure

The present disclosure relates to an optoelectronic device and in particular to an optoelectronic device including multiple optical channels. Also disclosed is a method of transmitting optical signals.

2. Description of the Related Art

A photonic component (e.g., a silicon-photonic) may be configured to transmit optical signals and be applicable to optical communication fields. Current photonic components receive optical signals via connection to optical fibers. However, it is a challenge to package multiple photonic components and optical fibers. Further, such design may also impose a longer transmission path, which can adversely affect the efficiency of optical communication.

SUMMARY

In some embodiments, an optoelectronic device includes a plurality of first waveguides and a plurality of second waveguides. The plurality of first waveguides are configured to receive a first plurality of optical signals. The plurality of second waveguides are configured to transmit a second plurality of optical signals. The plurality of first waveguides extend substantially along a first direction and the plurality of second waveguides extend substantially along a second direction different from and non-parallel with the first direction.

In some embodiments, an optoelectronic device includes an optoelectronic module, a first waveguide, and a second waveguide. The optoelectronic module has a first side and a second side different from the first side. The first waveguide is optically coupled with the first side of the optoelectronic module. The second waveguide is optically coupled with the second side of the optoelectronic module.

In some embodiments, an optoelectronic device includes a receiver, a first optoelectronic module, and a second optoelectronic module. The receiver is configured to transmit a first optical signal and a second optical signal. The first optoelectronic module is optically coupled with the receiver and configured to process the first optical signal. The second optoelectronic module is optically coupled with the receiver and configured to process the second optical signal.

BRIEF DESCRIPTION OF THE DRAWINGS

Aspects of some embodiments of the present disclosure are readily understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1:
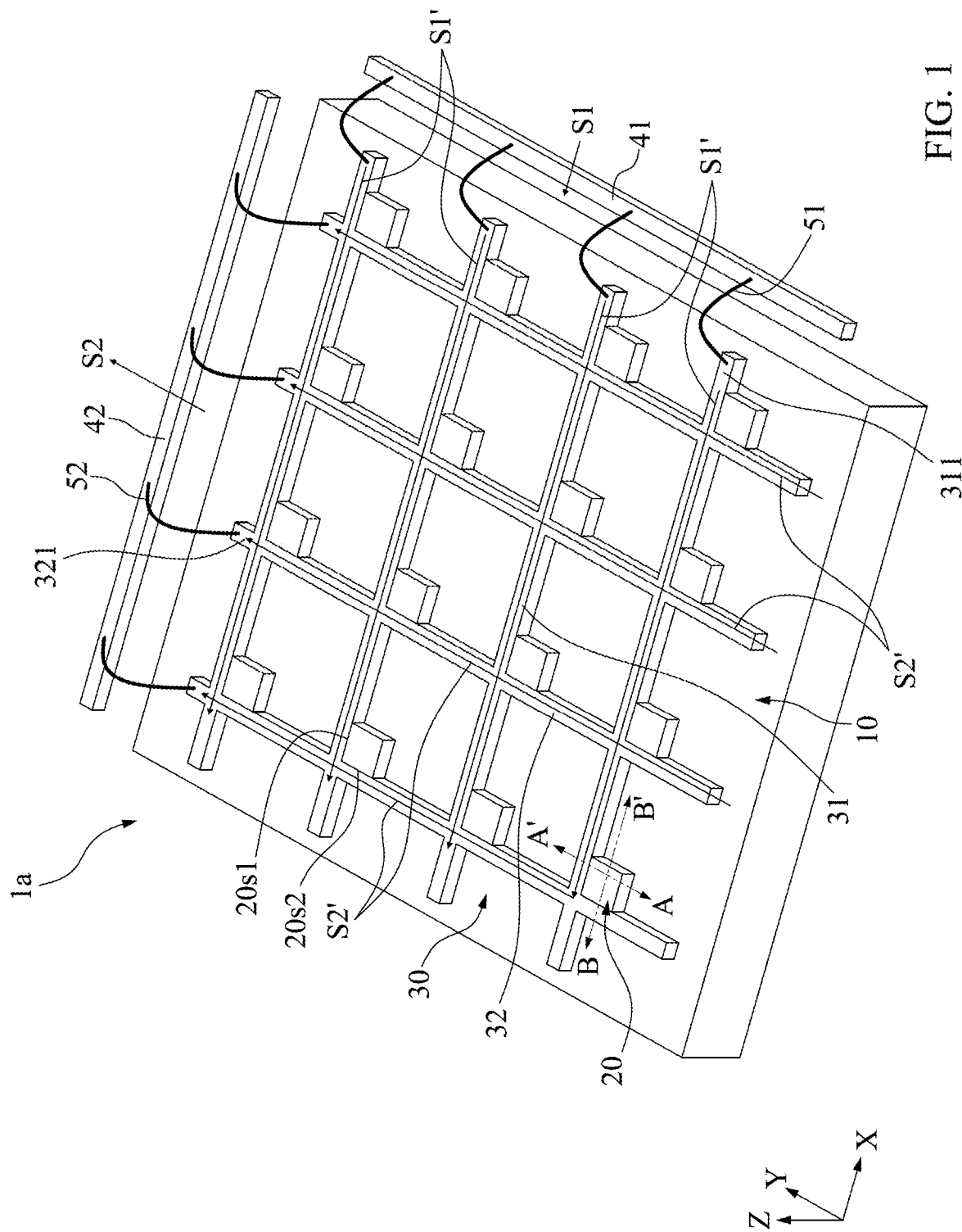
FIG. 1 is a perspective view of an exemplary optoelectronic device according to some embodiments of the present disclosure.

Common reference numerals are used throughout the drawings and the detailed description to indicate the same or similar components. Embodiments of the present disclosure will be readily understood from the following detailed description taken in conjunction with the accompanying drawings.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

As used herein the term "active surface" may refer to a surface of an electronic component or passive element on which contact terminals such as contact pads are disposed. The term "active surface" may also refer to a surface of a photonic component along which a waveguide is disposed, and the waveguide may be disposed adjacent to the active surface.

FIG. 1 is a perspective view of an exemplary optoelectronic device 1a according to some embodiments of the present disclosure. In some embodiments, the optoelectronic device 1a may include a carrier 10, a plurality of optoelectronic modules 20, an optical structure 30, a receiver 41, a transmitter 42, a plurality of optical connectors 51 and a plurality of optical connectors 52.

In some embodiments, the carrier 10 may be configured to support the optoelectronic module 20. In some embodiments, the carrier 10 may be configured to support the optical structure 30. In some embodiments, the carrier 10 may include, for example, a printed circuit board (PCB), such as a paper-based copper foil laminate, a composite copper foil laminate, or a polymer-impregnated glass-fiber-based copper foil laminate. In some embodiments, the carrier 10 may include an integrated circuit(s) (IC), such as an application-specific integrated circuit (ASIC) or other types of IC, therein.

In some embodiments, the optoelectronic module 20 may be disposed on or over an external surface (e.g., an upper surface) of the carrier 10. In some embodiments, the optoelectronic module 20 may be configured to process, receive, and/or transmit optical and/or electrical signals. Each of the optoelectronic module 20 is configured to receive the optical signal and to generate the processed optical signal. The optoelectronic module 20 may include a plurality of components, which will be described in detail in FIG. 2A and FIG. 2B.

In some embodiments, the optical structure 30 may be disposed on or over an external surface (e.g., an upper surface) of the carrier 10. In some embodiments, the optical structure 30 may be configured to receive and/or transmit the optical signals. In some embodiments, the optical structure 30 may be configured to transmit the optical signals to the optoelectronic module 20. In some embodiments, the optical structure 30 may be configured to receive the processed optical signals, processed by the optoelectronic module 20. In some embodiments, the optical structure 30 may include a plurality of waveguides 31 and waveguides 32. Each of the waveguides 31 may extend along, for example, an X-axis. Each of the waveguides 32 may extend along, for example, the Y-axis. In some embodiments, the optical structure 30 may include or be composed of silicon, silicon nitride, or other suitable materials. In some embodiments, the optical structure 30 may include resin-based materials, such as an epoxy compound. In some embodiments, the waveguides 31 and 32 may be disposed within different dimensions. In some embodiments, the waveguide 31 may be nonparallel to the waveguide 32.

In some embodiments, the waveguide 31 may be configured to transmit optical signals along, for example, the X-axis. In some embodiments, the waveguide 32 may be configured to transmit optical signals along, for example, a Y-axis. In some embodiments, the waveguide 31 may be substantially perpendicular to the waveguide 32. In some embodiments, the waveguide 31 may be slanted or angled with respect to the waveguide 32.

In some embodiments, the optical structure 30 and the optoelectronic modules 20 may be arranged side by side. In some embodiments, the optoelectronic module 20 may be disposed adjacent to the corner defined by the waveguide 31 and the waveguide 32. In some embodiments, each of the optoelectronic modules 20 may be disposed adjacent to a corresponding intersection of the waveguides 31 and 32. In some embodiments, each of the optoelectronic module 20 has a lateral surface 20s1 facing one of the waveguides 31 and a lateral surface 20s2 facing one of the waveguides 32. It should be noted that although FIG. 1 illustrates that the optoelectronic device 1a has four waveguides 31 and four waveguides 32, the optoelectronic device 1a may have more or less optical channels in other embodiments.

The receiver 41 may be configured to transmit optical signals to the optical structure 30. In some embodiments, the receiver 41 may function as a demultiplexer. The receiver 41 may also be referred to as "Rx." A signal (e.g., an optical signal) may be divided into a plurality of segments in serial in time domain and each of the segments may be transmitted to the corresponding outputs. For example, a signal S1 may be divided into signals S1'. In some embodiments, the signals S1' may be transmitted to the waveguides 31 through the optical connectors 51. In some embodiments, each of the optical connectors 51 may include, for example, a fiber array unit (FAU). Each of the waveguides 31 has a terminal 311 configured to receive the signal S1' through one of corresponding optical connectors 51. In some embodiments, the signal S1 may include an optical signal. In some embodiments, the signal S1' may include an optical signal. In some embodiments, multiple signals S1' may be concurrently or separately transmitted to the multiple waveguides 31. When multiple signals S1' are concurrently transmitted to different waveguides 31, corresponding optoelectronic modules 20 may process multiple signals S1' concurrently. In some embodiments, multiple signals S1' may be concurrently or separately transmitted to the same waveguide 31. When multiple signals S1' are concurrently transmitted to the same waveguide 31, the optoelectronic modules 20, optically coupled with the said waveguide 31, may concurrently or separately process multiple signals S1'.

The transmitter 42 may be configured to receive and/or collect optical signals from the optical structure 30. In some embodiments, the transmitter 42 may function as a multiplexer. The transmitter 42 may also be referred to as "Tx." A plurality of signals (e.g., optical signals) may be selected and/or combined into one output signal (e.g., an optical signal). For example, signals S2', each of which is processed from the signal S1' by the optoelectronic module 20, may be combined into a signal S2. In some embodiments, the signals S2' may be transmitted to the transmitter 42 through the optical connectors 52. In some embodiments, each of the optical connectors 52 may include, for example, a fiber array unit. Each of the waveguides 32 has a terminal 321 configured to transmit the signal S2' through one of corresponding optical connectors 52. In some embodiments, the signal S2 may include an optical signal (or a processed optical signal). In some embodiments, the signal S2' may include an optical signal (or a processed optical signal). In some embodiments, multiple signals S2' may be concurrently or separately transmitted to the same or different waveguides 32.

As shown in FIG. 1, the signal S1 may be divided into signals S1'. Each of the signals S1' may be transmitted along, for example, the X-axis. Each of the signals S1' may be concurrently transmitted to one of the optoelectronic modules 20 in some embodiments. Each of the signals S1' may be concurrently processed by the optoelectronic module 20 in some embodiments, and thereby a plurality of signals S2' (or processed signals) may be transmitted from the optoelectronic module 20. Each of the signals S2' may be transmitted along, for example, the Y-axis. Each of the signals S2' may be combined into the signal S2. In a conventional example, an optical signal is processed without being divided, requiring more time for processing. In the embodiments of the present disclosure, the optical signal may be divided into segments, and then transmitted by a plurality of optical channels. Further, the divided optical signals may be processed concurrently. In this condition, the optical signals can be transmitted more efficiently, which enhances the performance of the optoelectronic device 1a.

Figure 2A:
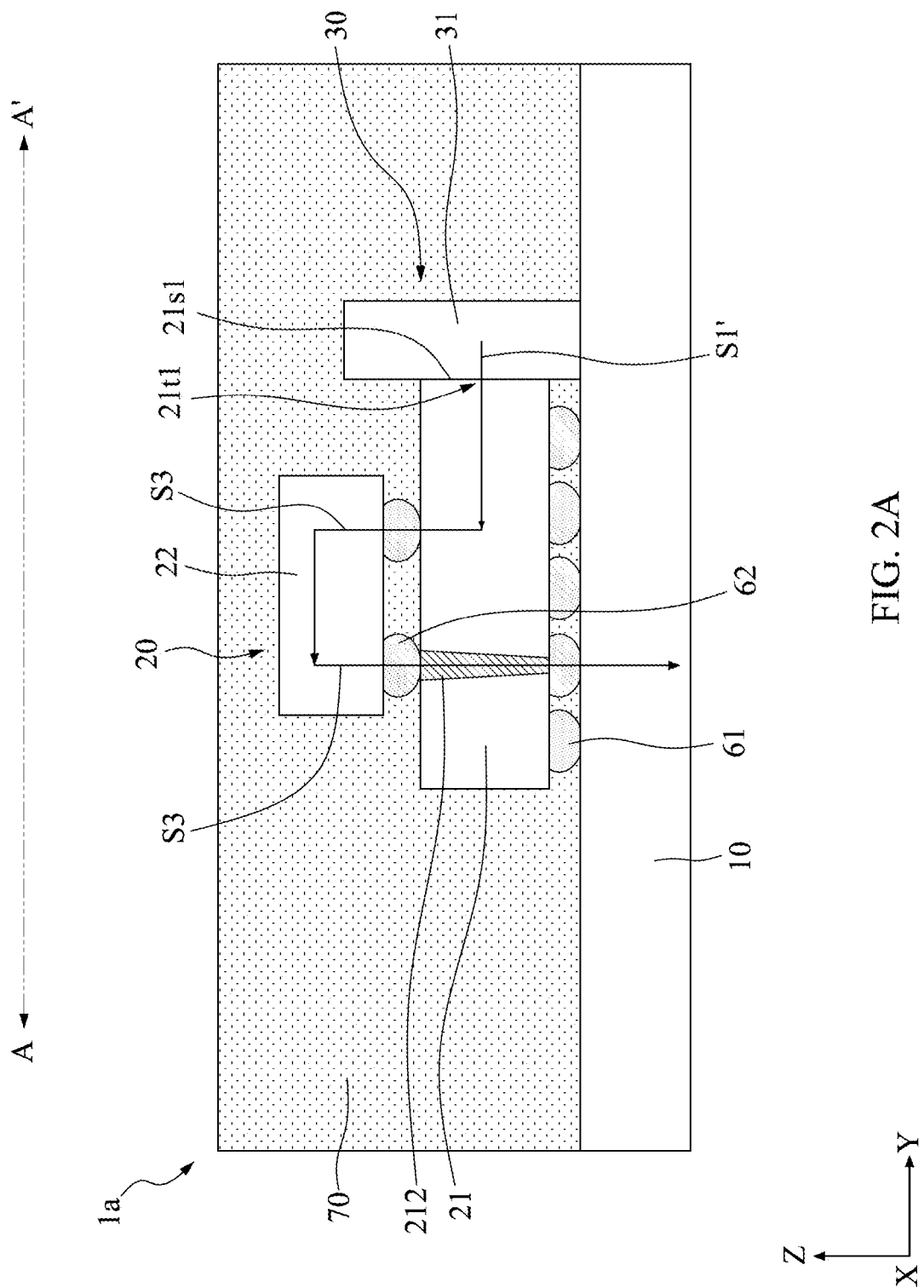
FIG. 2A is a cross-section along line A-A' of the optoelectronic device as shown in FIG. 1 according to some embodiments of the present disclosure.

FIG. 2A is a cross-section along line A-A' of the optoelectronic device 1a as shown in FIG. 1 according to some embodiments of the present disclosure.

In some embodiments, the optoelectronic module 20 may include a photonic component 21 and an electronic component 22. In some embodiments, the photonic component 21 may be disposed over or on the carrier 10. In some embodiments, the photonic component 21 may be signally and/or optically coupled with the waveguide 31 of the optical structure 30. In some embodiments, a transparent adhesive, such as an optical clear adhesive (OCA), may be disposed between the photonic component 21 and the optical structure 30. The photonic component 21 may be configured to process, receive, and/or transmit optical signals. In some embodiments, the photonic component 21 can convert the optical signals to electric signals or convert the electric signals to optical signals by, for example, an electrical-to-optical converter and an optical-to-electrical converter (not shown). The photonic component 21 can include, but is not limited to, a photonic integrated circuit (PIC) and/or other suitable ICs. In some embodiments, the photonic component 21 may include a waveguide (not shown) configured to receive and/or transmit the signal S1' from the optical structure 30. The signal S1' may be converted to a signal S3. The signal S3 may include an electrical signal. The signal S3 may be transmitted from the photonic component 21 to the electronic component 22.

It should be noted that although FIG. 2A illustrates photonic component 21 in contact with the optical structure 30, the optoelectronic module 20 may be spaced apart from the optical structure 30 in order to meet requirements of optical coupling of the signal S1' from the optical structure 30 to the photonic component 21. Further, optical elements (not shown) may be disposed between the photonic component 21 and the optical structure 30 to facilitate optical coupling. In some embodiments, the optical elements may be encapsulated by the OCA or other suitable materials. In some embodiments, the photonic component 21 may have a terminal 21t1 configured to receive the optical signal. The terminal 21t1 is disposed at a side 21s1 of the photonic component 21. The side 21s1 of the photonic component 21 may abut the waveguide 31.

In some embodiments, the electronic component 22 may be disposed over or on the photonic component 21. In some embodiments, the electronic component 22 may be spaced apart from the carrier 10 by the photonic component 21. The electronic component 22 may be configured to modulate the signal S3. For example, the electronic component 22 may be configured to amplify the signal S3. In some embodiments, the electronic component 22 may include an amplifier IC or other suitable ICs. In some embodiments, the photonic component 21 can include, but is not limited to, an electronic integrated circuit (EIC) and/or other suitable ICs.

In some embodiments, the electronic component 22 may be electrically connected to the carrier 10 through a through-via 212 of the photonic component 21. The through-via 212 may penetrate the substrate (e.g., a silicon substrate) of the photonic component 21. In some embodiments, the carrier 10 may include an IC(s) configured to process the signal S3. For example, the carrier 10 may include an ASIC configured to process the signal S3.

In some embodiments, the optoelectronic device 1a may further include an encapsulant 70. In some embodiments, the encapsulant 70 may be disposed over or on the carrier 10. In some embodiments, the encapsulant 70 may encapsulate the optoelectronic module 20. In some embodiments, the encapsulant 70 may encapsulate the photonic component 21. In some embodiments, the encapsulant 70 may encapsulate the electronic component 22. In some embodiments, the encapsulant 70 may encapsulate the optical structure 30. In some embodiments, the encapsulant 70 may encapsulate the waveguide 31. In some embodiments, the encapsulant 70 may include insulation or dielectric material. In some embodiments, the encapsulant 70 may be made of molding material that may include, for example, a Novolac-based resin, an epoxy-based resin, a silicone-based resin, or other another suitable encapsulant. Suitable fillers may also be included, such as powdered $SiO_2$. In some embodiments, a portion of the encapsulant 70 may serve as a cladding layer to facilitate the transmission of the optical signal (e.g., S1'). Further, optical signals may be prevented from being refracted to the encapsulant 70. In some embodiments, the refractive index of the material of the optical structure 30 may be greater than that of the encapsulant 70. The encapsulant 70 may include optically reflective material, optically absorbing material, optically shielding material or other suitable materials in order to prevent the leak of optical signals or prevent optical signals from being influenced by an external light.

In some embodiments, the optoelectronic device 1a may further include electrical connectors 61. The electrical connectors 61 may be disposed over or on the carrier 10. In some embodiments, the electrical connectors 61 may be disposed between the carrier 10 and the photonic component 21. In some embodiments, the electrical connectors 61 may be configured to transmit and/or receive the signal S3. The electrical connectors 61 may include one or more materials, such as alloys of gold and tin solder or alloys of silver and tin solder.

In some embodiments, the optoelectronic device 1a may further include electrical connectors 62. The electrical connectors 62 may be disposed over or on the photonic component 21. In some embodiments, the electrical connectors 62 may be disposed between the photonic component 21 and the electronic component 22. In some embodiments, the electrical connectors 62 may be configured to signally and/or electrically connect the photonic component 21 and the electronic component 22. In some embodiments, the electrical connectors 62 may be configured to transmit and/or receive the signal S3. The electrical connectors 62 may include one or more materials, such as alloys of gold and tin solder or alloys of silver and tin solder.

FIG. 2A illustrates the path of the signal. In some embodiments, the signal S1' may be transmitted from the waveguide 31 of the optical structure 30 to the photonic component 21. The signal S1' may be converted to the signal S3 by the photonic component 21. In some embodiments, the signal S3 may be transmitted from the photonic component 21 to the carrier 10 through the electrical connectors 62, the electronic component 22, the through-via 212 and the electrical connectors 61.

Figure 2B:
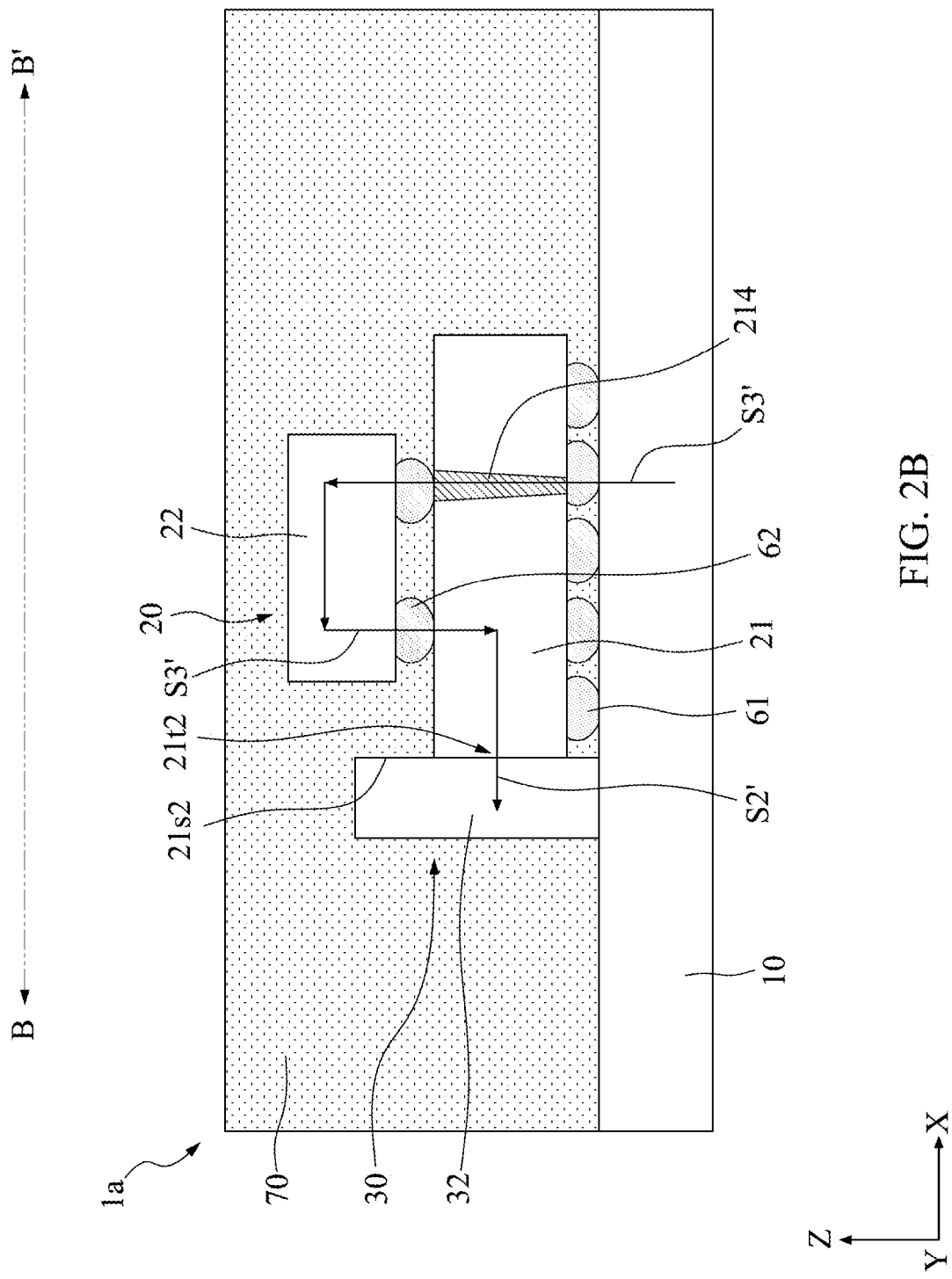
FIG. 2B is a cross-section along line B-B' of the optoelectronic device as shown in FIG. 1 according to some embodiments of the present disclosure.

FIG. 2B is a cross-section along line B-B' of the optoelectronic device 1a as shown in FIG. 1 according to some embodiments of the present disclosure.

The signal S3 may be processed and converted to the signal S3' by the ICs in the carrier 10. In some embodiments, the signal S3' may be transmitted from the carrier 10 to the electronic component 22 through a through-via 214 of the photonic component 21. The through-via 214 may penetrate the substrate (e.g., a silicon substrate) of the photonic component 21.

FIG. 2B illustrates the path of the processed signal. In some embodiments, the signal S3' may be transmitted from the carrier 10 to the photonic component 21 through the through-via 214 and the electronic component 22. The signal S3' may be converted to the signal S2'. In some embodiments, the signal S2' may be transmitted from the photonic component 21 to the waveguide 32 of the optical structure 30. It should be noted that although FIG. 2B illustrates photonic component 21 is in contact with the optical structure 30, the optoelectronic module 20 may be spaced apart from the optical structure 30 in order to meet requirements of optical coupling of the signal S2' from the photonic component 21 to the optical structure 30. Further, optical elements (not shown) may be disposed between the photonic component 21 and the optical structure 30 to facilitate optical coupling. In some embodiments, the optical elements may be encapsulated by the OCA or other suitable materials. In some embodiments, the photonic component 21 may have a terminal 21t2 configured to transmit the processed optical signal. The terminal 21t2 may be disposed at a side 21s2 of the photonic component 21. The side 21s2 may abut the side 21s1 as shown in FIG. 2A. The side 21s2 of the photonic component 21 may abut the waveguide 32. In some embodiments, the electrical connectors 62 may be configured to transmit and/or receive the signal S3'. In some embodiments, the electrical connectors 61 may be configured to transmit and/or receive the signal S3'.

FIG. 2A and FIG. 2B illustrate the process and path of the signal and processed signal. As shown in FIG. 1, there are sixteen optoelectronic modules 20, which may concurrently process and/or transmit sixteen segments (e.g., S1', S3, S3', and/or S2') of signals. Therefore, the optoelectronic device 1a can speed optical communication in comparison with conventional optoelectronic devices.

Figure 3A:
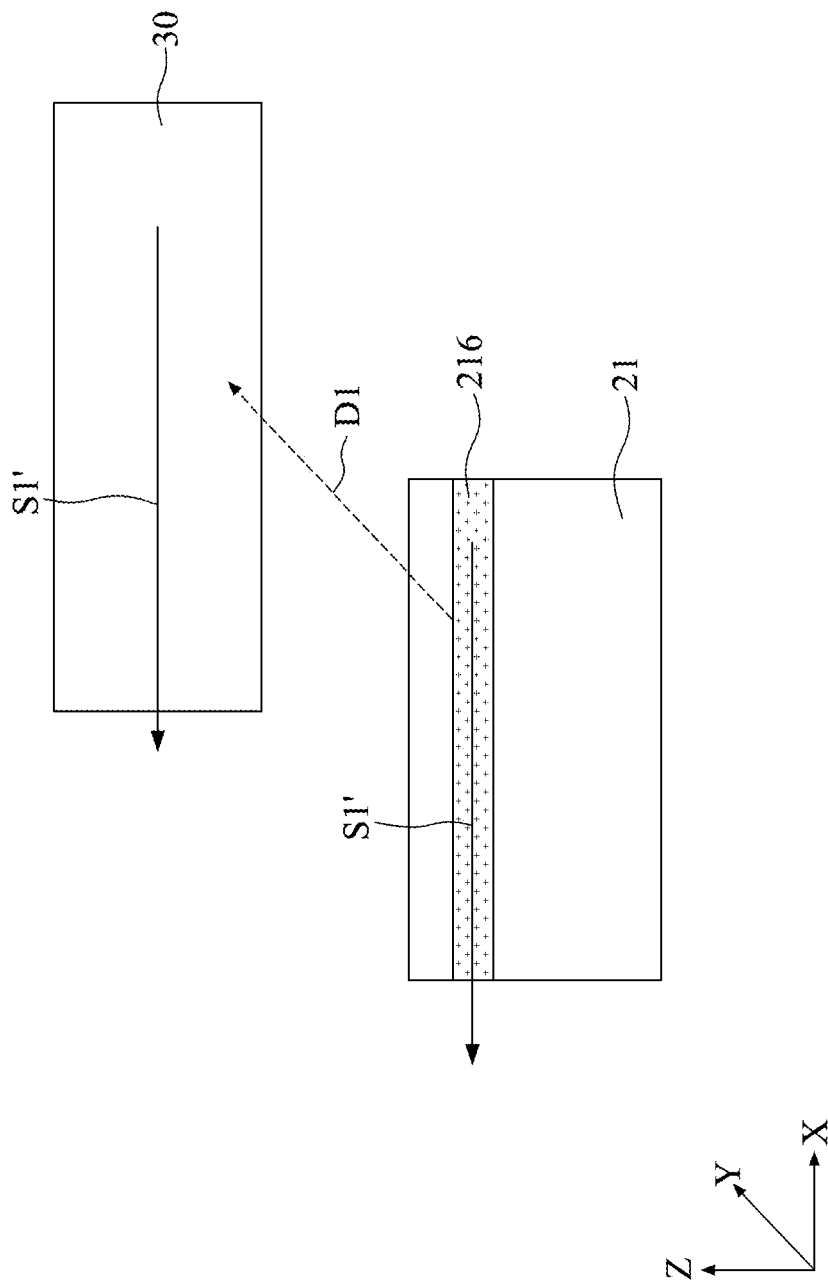
FIG. 3A is a schematic view of an exemplary optoelectronic device according to some embodiments of the present disclosure.

FIG. 3A is a schematic view of an exemplary optoelectronic device according to some embodiments of the present disclosure.

In some embodiments, the photonic component 21 may include a waveguide structure 216 configured to transmit an optical signal (e.g., the signal S1'). In some embodiments, the waveguide structure 216 may include or be composed of silicon, silicon nitride, or other suitable materials. A cladding layer (not shown) may cover the waveguide structure 216. The optical structure 30 and the photonic component 21 may be separated by a distance D1 along the Y-axis (or the X-axis). In some embodiments, the distance D1 may depend on the wavelength of the signal S1'. In some embodiments, the distance D1 may be positively proportional to the wavelength of the optical signal. In some embodiments, an OCA (not shown) may be disposed between the waveguide structure 216 and the optical structure 30.

Figure 3B:
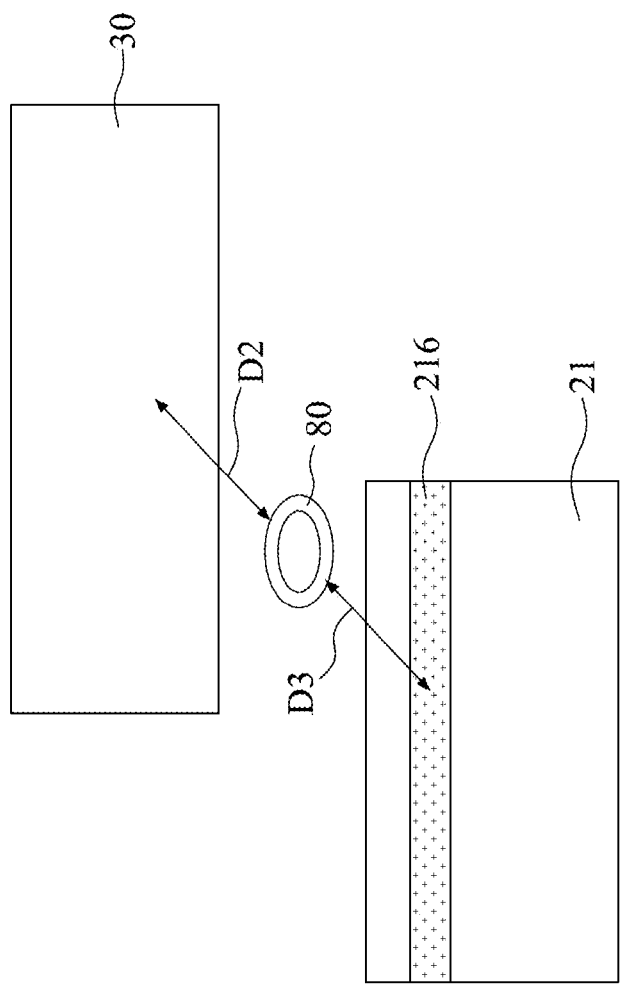
FIG. 3B is a schematic view of an exemplary optoelectronic device according to some embodiments of the present disclosure.

FIG. 3B is a schematic view of an exemplary optoelectronic device according to some embodiments of the present disclosure.

In some embodiments, at least one optical element 80 may be disposed between the photonic component 21 and the optical structure 30. The optical element 80 may be configured to transmit an optical signal. In some embodiments, the optical element 80 may be configured to change, modify, and/or control the direction of an optical signal. In some embodiments, the optical element 80 may include an optical resonator. The optical element 80 and the optical structure 30 may be separated by a distance D2 along the Y-axis (or the X-axis). The optical element 80 and the photonic component 21 may be separated by a distance D3 along the Y-axis (or the X-axis). The distance D2 and/or D3 may depend on the wavelength of the transmitted optical signal. In some embodiments, the distance D2 (or D3) may be positively proportional to the wavelength of the optical signal. In some embodiments, the distance D2 may be substantially equal to the distance D3. In some embodiments, the distance D2 may be different from the distance D3.

FIG. 4 is a cross-section of an optoelectronic device 1b according to some embodiments of the present disclosure. The optoelectronic device 1b is similar to the optoelectronic device 1a as shown in FIG. 2A and FIG. 2B, with differences therebetween as follows.

In some embodiments, the optoelectronic module 20 may further include an electronic component 23. In some embodiments, the electronic component 23 may be disposed on or over the electronic component 22. The electronic component 23 may be spaced apart from the photonic component 21 by the electronic component 22. In some embodiments, the electronic component 23 may be configured to process an electrical signal, such as the signal S3. The electronic component 23 may include a semiconductor die or a chip, such as an ASIC or other suitable ICs.

In some embodiments, the optoelectronic device 1b may further include electrical connectors 63. The electrical connectors 63 may be disposed over or on the electronic component 23. In some embodiments, the electrical connectors 63 may be disposed between the electronic component 22 and the electronic component 23. In some embodiments, the electrical connectors 63 may be configured to signally and/or electrically connect the electronic component 22 and the electronic component 23. In some embodiments, the electrical connectors 63 may be configured to transmit and/or receive the signal S3 and the signal S3'. The electrical connector 63 may include one or more materials, such as alloys of gold and tin solder or alloys of silver and tin solder.

Figure 4A:
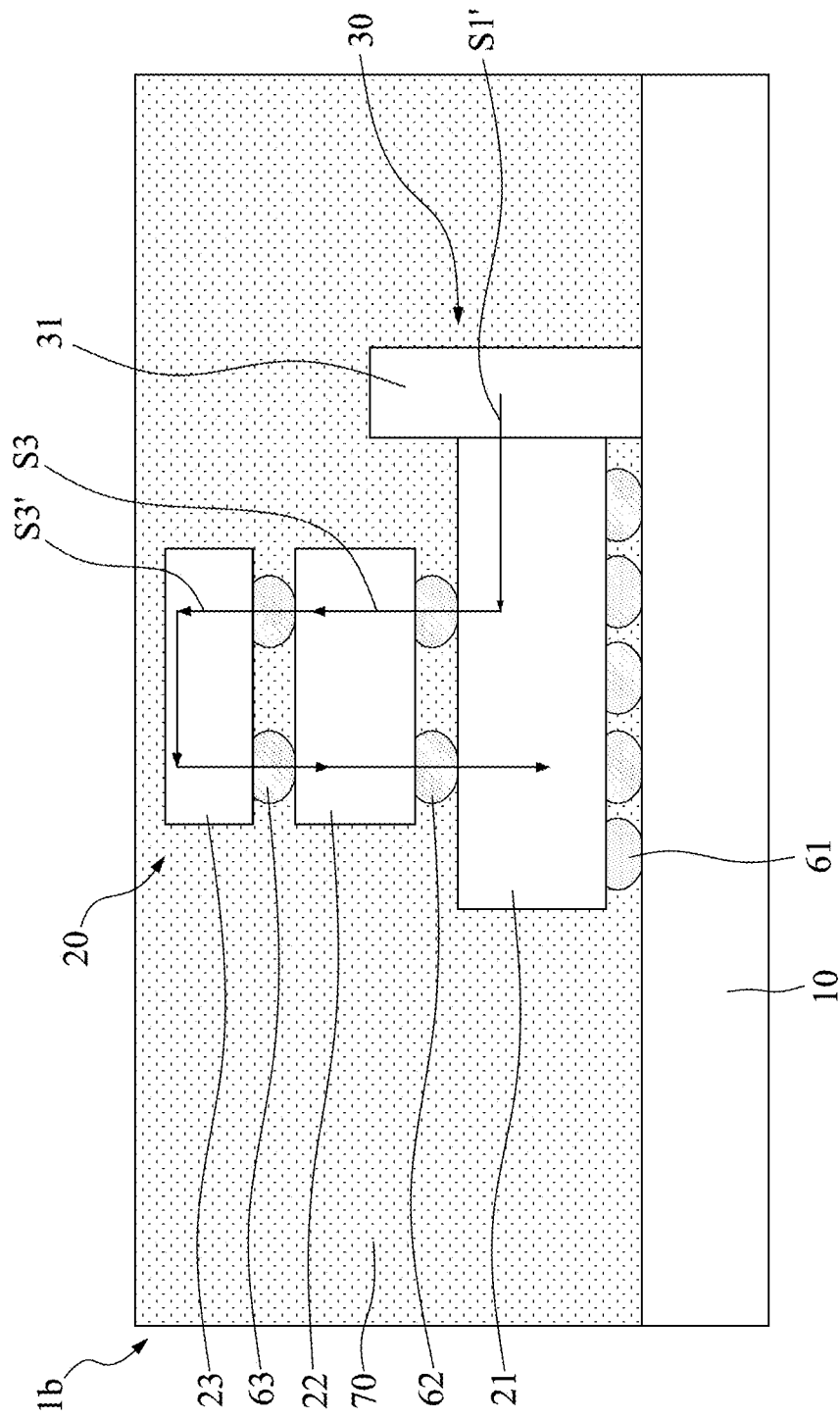
FIG. 4A and FIG. 4B are a cross-section of an optoelectronic device according to some embodiments of the present disclosure.
Figure 4B:
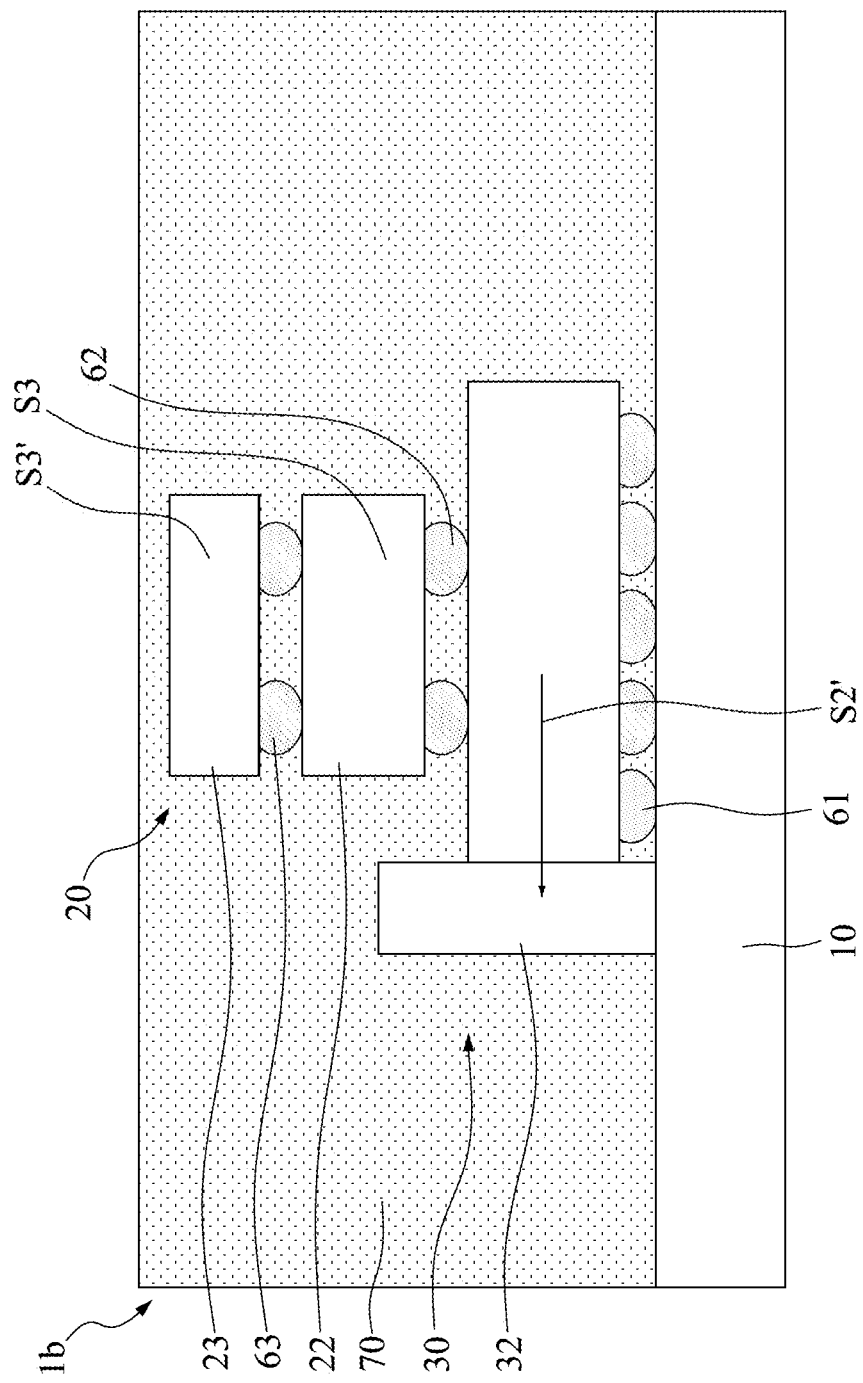

FIG. 4A and FIG. 4B illustrate the path of the signal. In some embodiments, the signal S1' may be transmitted from the optical structure 30 to the photonic component 21. The signal S1' may be converted to the signal S3. In some embodiments, the signal S3 may be transmitted from the photonic component 21 to the electronic component 23 through the electronic component 22. The signal S3 may be processed and converted to the signal S3' by the electronic component 23. In some embodiments, the signal S3' may be transmitted from the electronic component 23 to the photonic component 21 through the electronic component 22. The signal S3' may be converted to the signal S2' by the photonic component 21. In some embodiments, the signal S2' may be transmitted from the photonic component 21 to the optical structure 30 as shown in FIG. 4B.

Figure 5A:
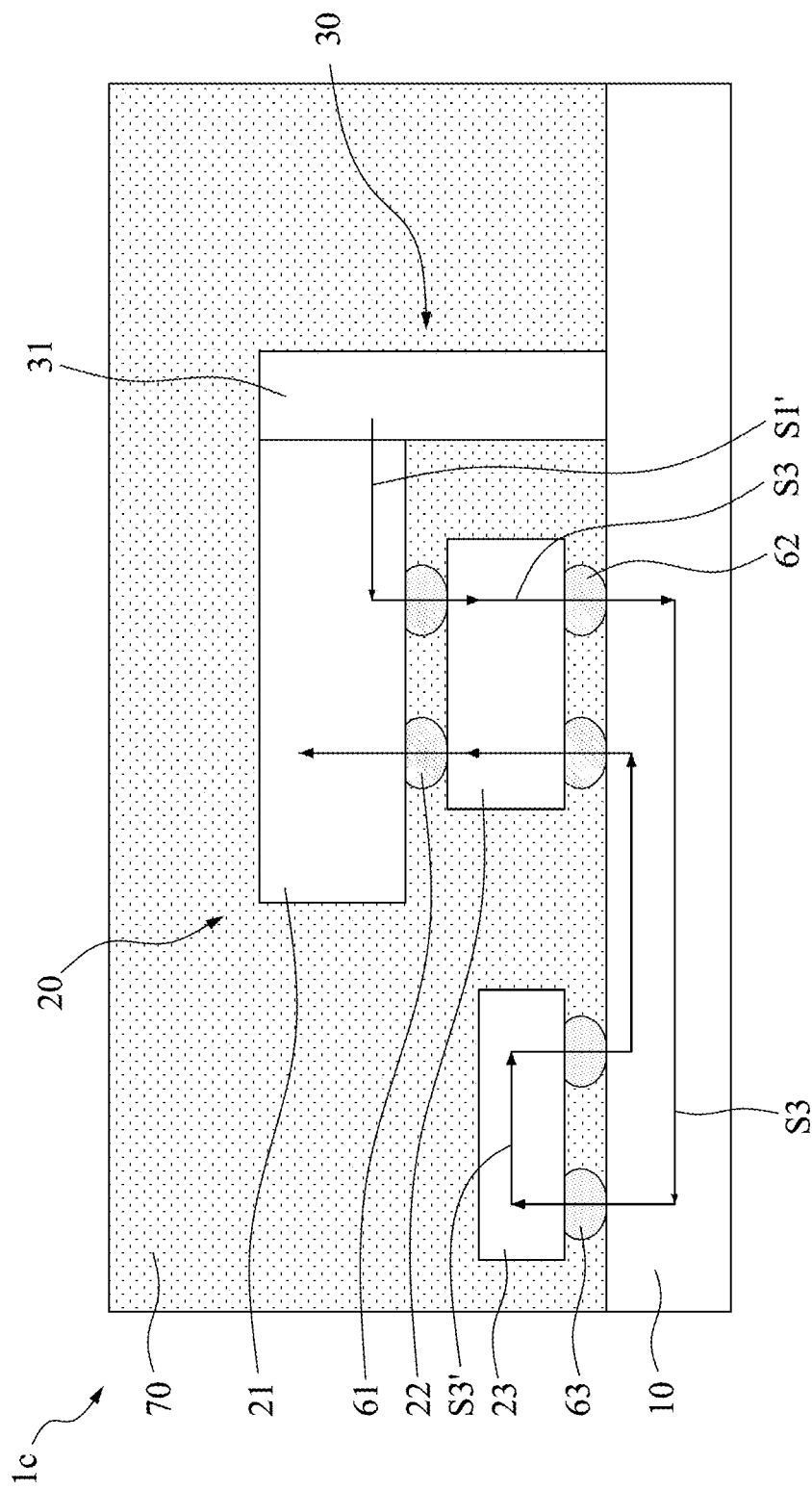
FIG. 5A and FIG. 5B are a cross-section of an optoelectronic device according to some embodiments of the present disclosure.
Figure 5B:
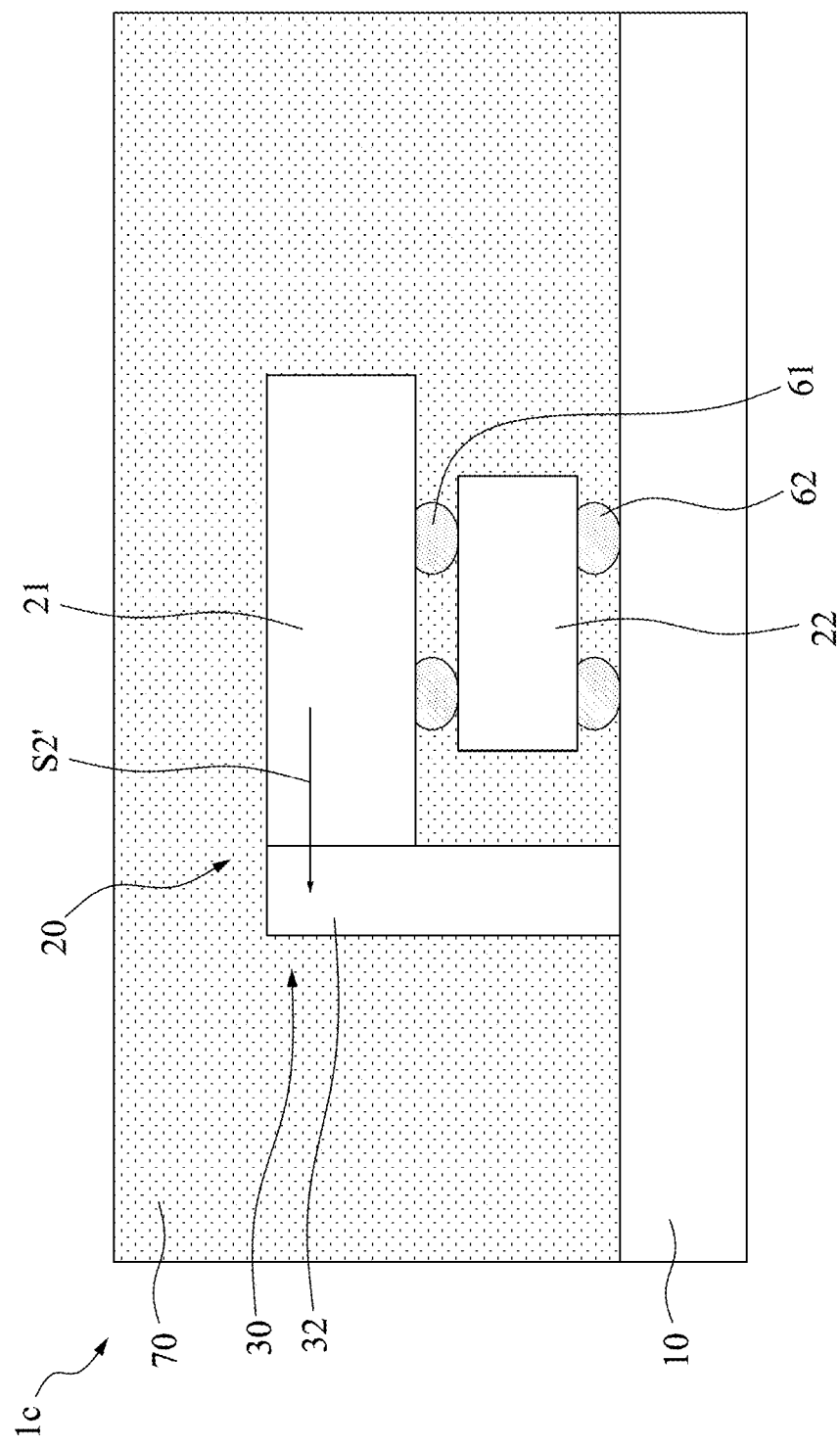

FIG. 5A and FIG. 5B are a cross-section of an optoelectronic device 1c according to some embodiments of the present disclosure. The optoelectronic device 1c is similar to the optoelectronic device 1b as shown in FIG. 4A and FIG. 4B, with differences therebetween as follows.

In some embodiments, the photonic component 21 may be disposed over or on the electronic component 22. In some embodiments, the photonic component 21 may be spaced apart from the carrier 10 by the electronic component 22. In some embodiments, the electronic component 23 may be disposed on or disposed over the carrier 10. In some embodiments, the electronic component 23 and the electronic component 22 may be arranged side by side.

FIG. 5A and FIG. 5B illustrate the path of the signal. In some embodiments, the signal S1' may be transmitted from the optical structure 30 to the photonic component 21. The signal S1' may be converted to the signal S3 by the photonic component 21. In some embodiments, the signal S3 may be transmitted from the photonic component 21 to the electronic component 23 through the electronic component 22 and the carrier 10. The signal S3 may be processed and converted to the signal S3' by the electronic component 23. In some embodiments, the signal S3' may be transmitted from the electronic component 23 to the photonic component 21 through the carrier 10 and the electronic component 22. The signal S3' may be converted to the signal S2'. In some embodiments, the signal S2' may be transmitted from the photonic component 21 to the optical structure 30 as shown in FIG. 5B. In other embodiments, the electronic component 23 may be disposed under the carrier 10. That is, the electronic components 22 and 23 may be disposed on opposite surfaces of the carrier 10.

Figure 6:
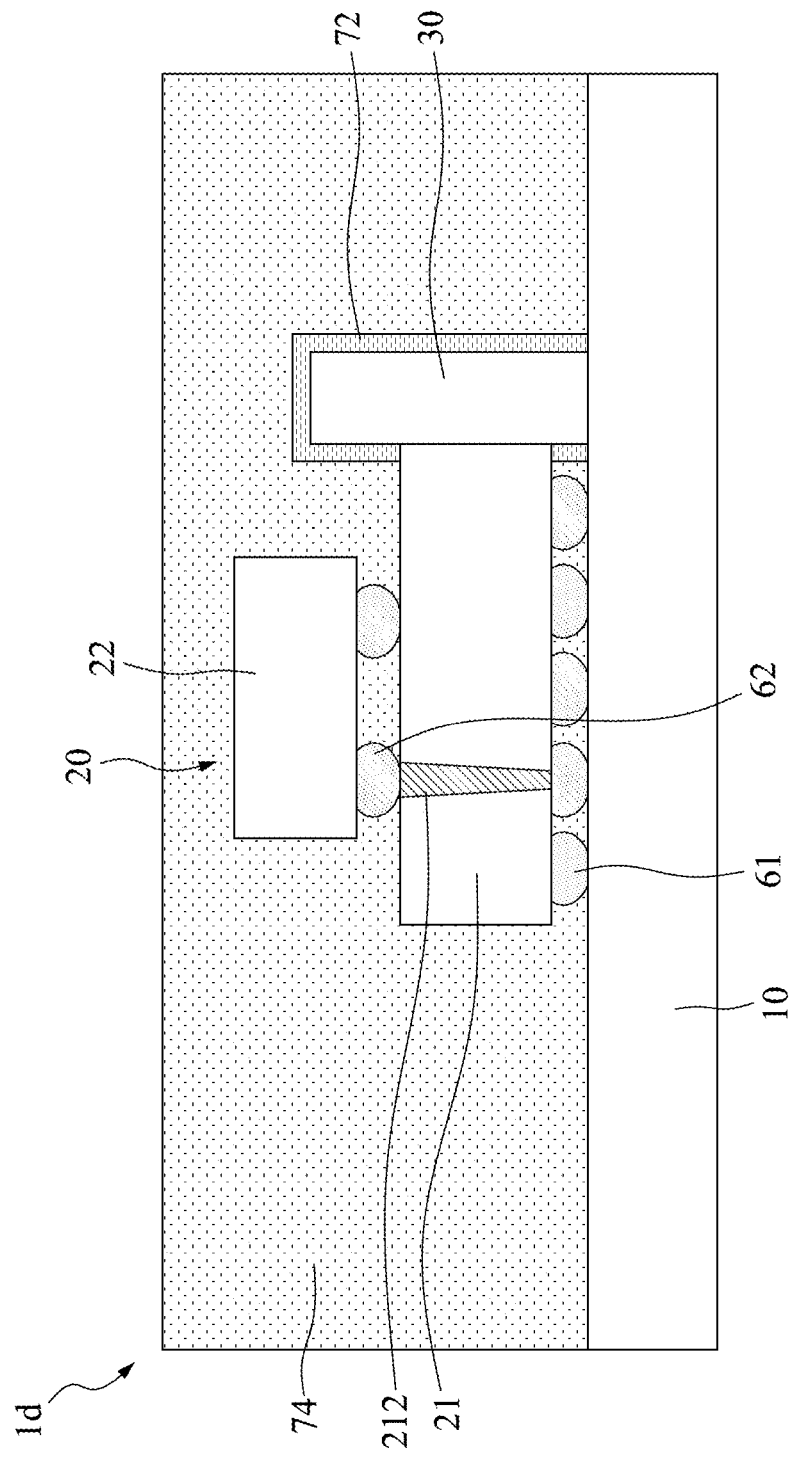
FIG. 6 is a cross-section of an optoelectronic device according to some embodiments of the present disclosure.

FIG. 6 is a cross-section of an optoelectronic device 1d according to some embodiments of the present disclosure. The optoelectronic device 1d is similar to the optoelectronic device 1a as shown in FIG. 2A and FIG. 2B, with differences therebetween as follows.

In some embodiments, the optoelectronic device 1d may further include a cladding layer 72. In some embodiments, the cladding layer 72 may encapsulate the optical structure 30. In some embodiments, the cladding layer 72 may cover the upper surface (not annotated) of the optical structure 30. In some embodiments, the cladding layer 72 may cover the lateral surface (not annotated) of the optical structure 30. In some embodiments, the cladding layer 72 may cover a portion of the lateral surface of the optical structure 30. In some embodiments, a portion of the lateral surface of the optical structure 30 may be exposed from the cladding layer 72. In some embodiments, the cladding layer 72 may facilitate the transmission of the optical signal. In some embodiments, the refractive index of the material of the optical structure 30 may be greater than that of the cladding layer 72. In some embodiments, the cladding layer 72 may facilitate the transmission of optical signals within the optical structure 30 and prevent the optical signals from being refracted toward an external environment.

In some embodiments, the optoelectronic device 1d may further include a transparent element 74. In some embodiments, the transparent element 74 may encapsulate the photonic component 21, the electronic component 22, and the cladding layer 72. The transparent element 74 may include an optical transparent material. In some embodiments, the transparent element 74 may be transparent to a peak wavelength of the optical signal, such as the optical signals S1' and S2' as shown in FIG. 2A and FIG. 2B. In some embodiments, the transparent element 74 may be made of molding material that may include, for example, a Novolac-based resin, an epoxy-based resin, a silicone-based resin, or other suitable encapsulant.

Figure 7A:
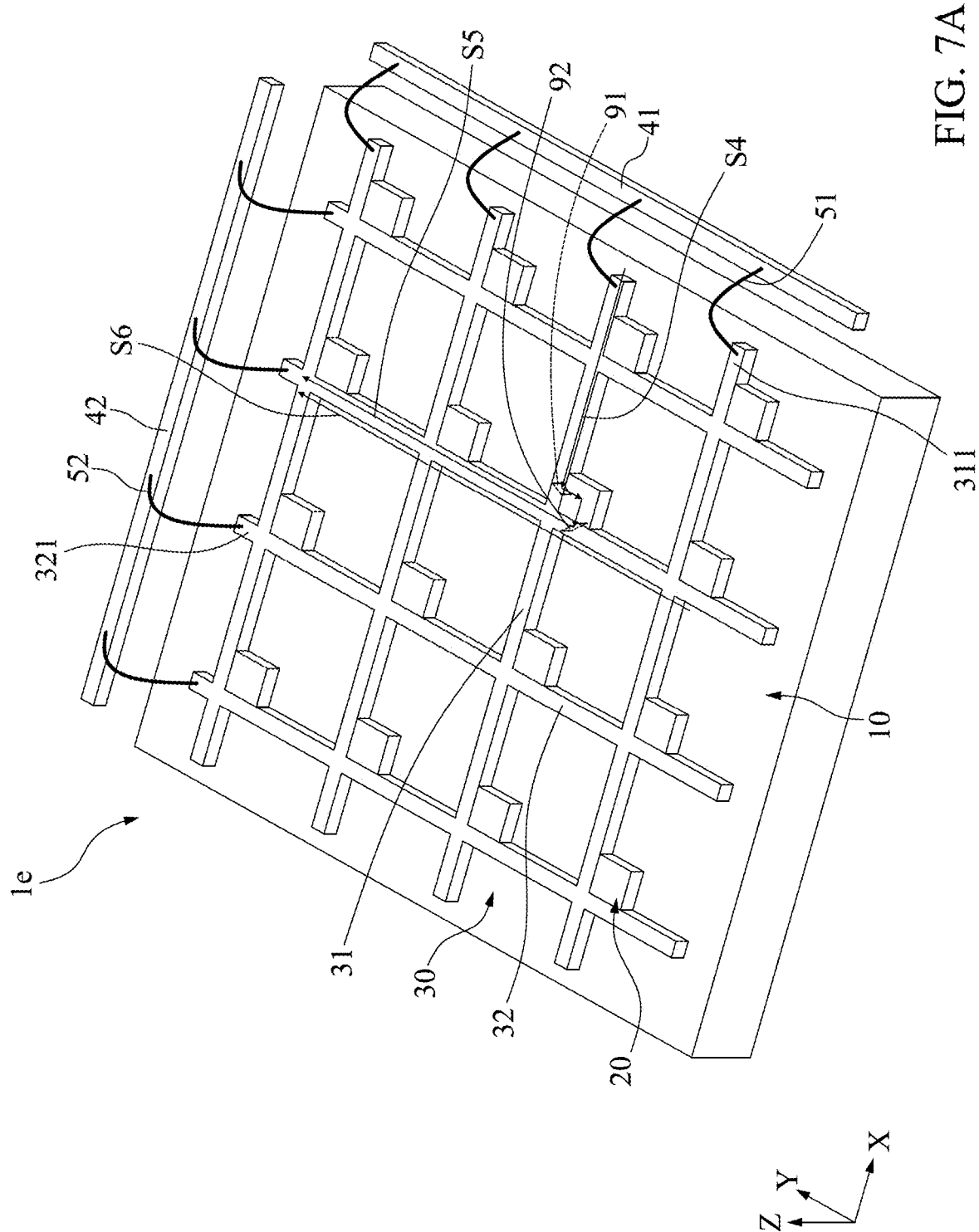
FIG. 7A is a perspective view of an exemplary optoelectronic device according to some embodiments of the present disclosure.

FIG. 7A is a perspective view of an exemplary optoelectronic device 1e according to some embodiments of the present disclosure. The optoelectronic device 1e is similar to the optoelectronic device 1a as shown in FIG. 1, with differences therebetween as follows.

In some embodiments, the optoelectronic device 1e may further include optical elements 91 and 92. In some embodiments, each of the optical elements 91 and 92 may be disposed within the optical structure 30. In some embodiments, each of the optical elements 91 and 92 may be configured to facilitate the transmission of the optical signals. In some embodiments, each of the optical elements 91 and 92 may be configured to reflect optical signals. In some embodiments, each of the optical elements 91 and 92 may be configured to allow an optical signal with a specific transmission direction to pass through. For example, a signal S4 may be reflected by the optical element 91, and then transmitted or guided toward the optoelectronic module 20. A processed signal S5, processed from the signal S4, may be reflected by the optical element 92, and then transmitted toward the optical connector 52. A signal S6, transmitted along the Y-axis (e.g., +Y-axis) may pass through the optical element 92. In some embodiments, each of the optical elements 91 and 92 may include an optical resonator, an optical film, and/or other suitable components.

Figure 7B:
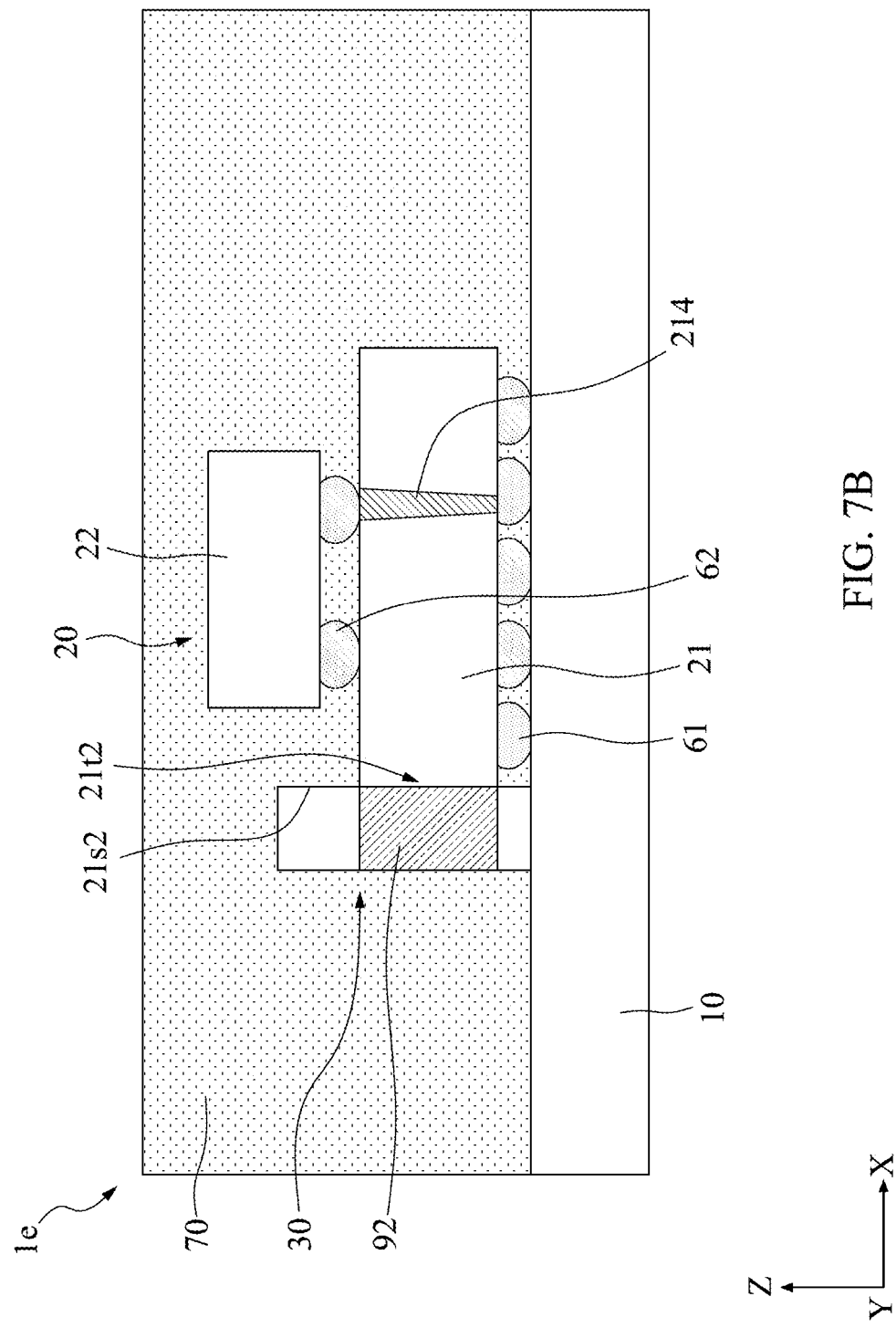
FIG. 7B is another perspective view of the optoelectronic device as shown in FIG. 7A according to some embodiments of the present disclosure.

FIG. 7B is another perspective view of the optoelectronic device 1e as shown in FIG. 7A according to some embodiments of the present disclosure. As shown in FIG. 7B, the optical element 92 may be disposed across the waveguide 32. In some embodiments, the optical element 91 may be disposed across the waveguide 31.

Figure 8:
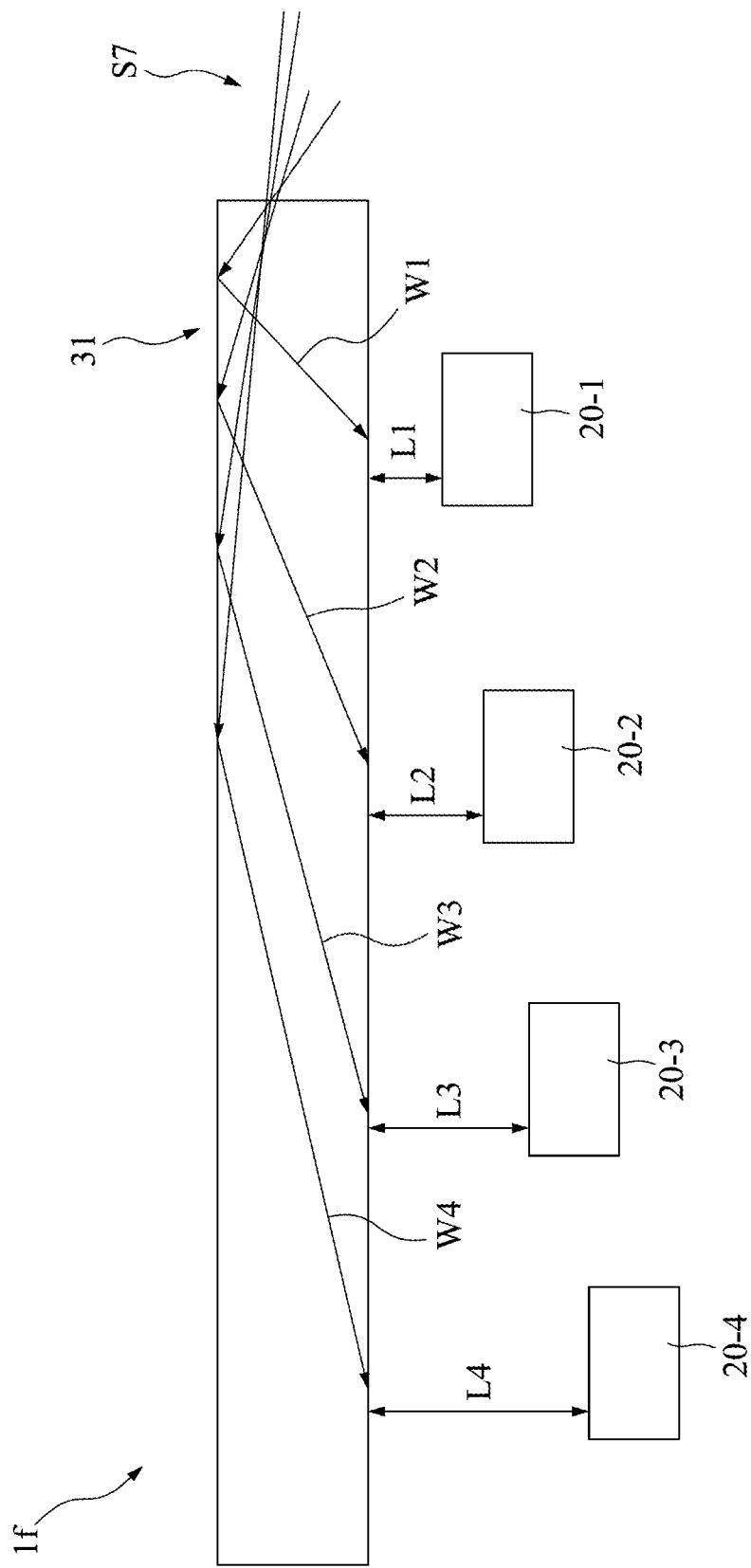
FIG. 8 is a partial top view of an optoelectronic device according to some embodiments of the present disclosure.

FIG. 8 is a partial top view of an optoelectronic device 1f according to some embodiments of the present disclosure. The optoelectronic device 1f may include optoelectronic modules 20-1, 20-2, 20-3, and 20-4. An optical signal S7 may be divided into signals W1, W2, W3, and W4. The signals W1, W2, W3, and W4 may have different wavelengths (or different band of wavelength). The optoelectronic modules 20-1, 20-2, 20-3, and 20-4 may be configured to receive the signals W1, W2, W3, and W4, respectively. In some embodiments, the distance between the optoelectronic module and the waveguide 31 may depend on the wavelength of the signal. For example, the optoelectronic module 20-1 and the waveguide 31 may have a distance L1 therebetween, the optoelectronic module 20-2 and the waveguide 31 may have a distance L2 therebetween, the optoelectronic module 20-3 and the waveguide 31 may have a distance L3 therebetween, and the optoelectronic module 20-4 and the waveguide 31 may have a distance L4 therebetween. In some cases, the wavelength of the signal S4 is greater than that of the signal S3, the wavelength of the signal S3 is greater than that of the signal S2, and the wavelength of the signal S2 is greater than that of the signal S1. In this condition, the distance L4 may be greater than distance L3, the distance L3 may be greater than distance L2, and the distance L2 may be greater than distance L1.

Figure 9:
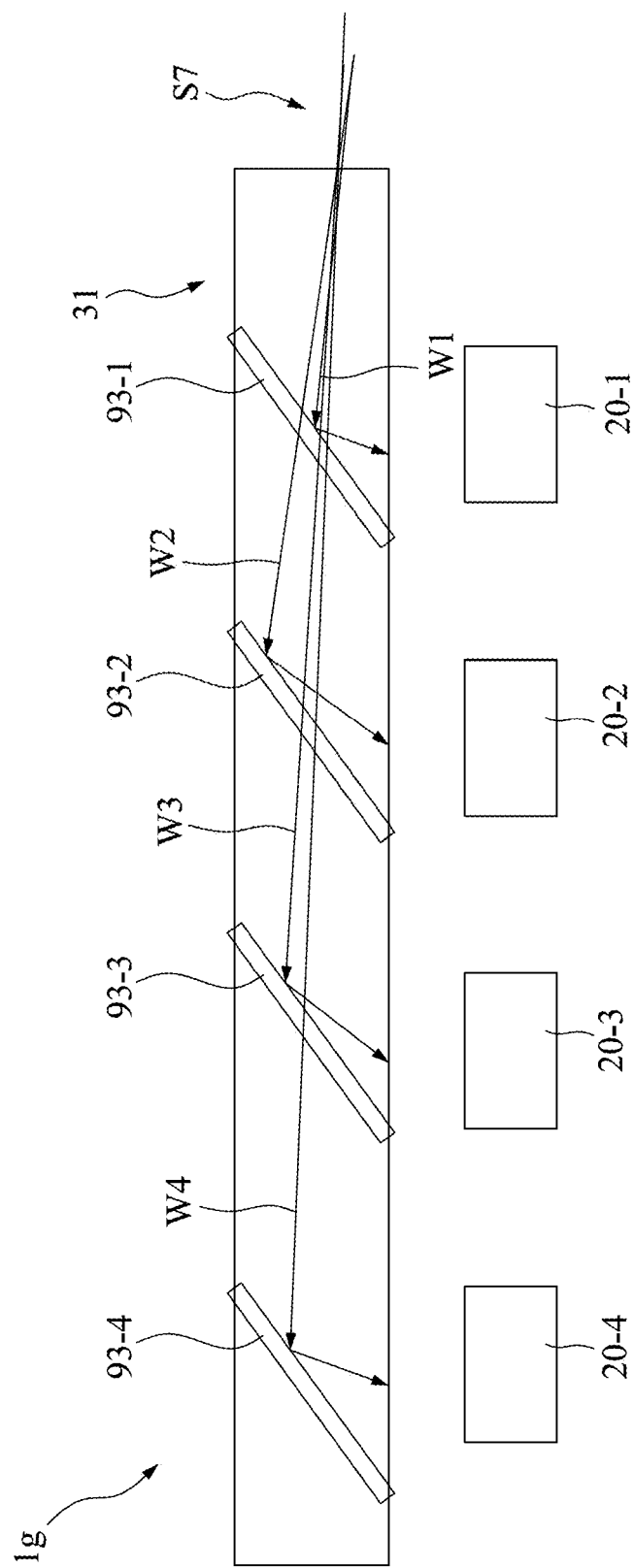
FIG. 9 is a partial top view of an optoelectronic device according to some embodiments of the present disclosure.

FIG. 9 is a partial top view of an optoelectronic device 1g according to some embodiments of the present disclosure. The optoelectronic device 1g is similar to the optoelectronic device 1f as shown in FIG. 8, with differences therebetween as follows.

The optoelectronic device 1g may include optical elements 93-1, 93-2, 93-3, and 93-4. Each of the optical elements 93-1, 93-2, 93-3, and 93-4 may be configured to facilitate the optical communication between waveguide 31 and optoelectronic modules 20-1, 20-2, 20-3, and 20-4. Each of the optical elements 93-1, 93-2, 93-3, and 93-4 may be configured to reflect a signal with a specific wavelength (or band of wavelength), and allow a signal of remaining wavelength (or band of wavelength) to pass through. For example, the optical element 93-1 may reflect the signal W1, and allow signals W2, W3, and W4 to pass through.

Figure 10:
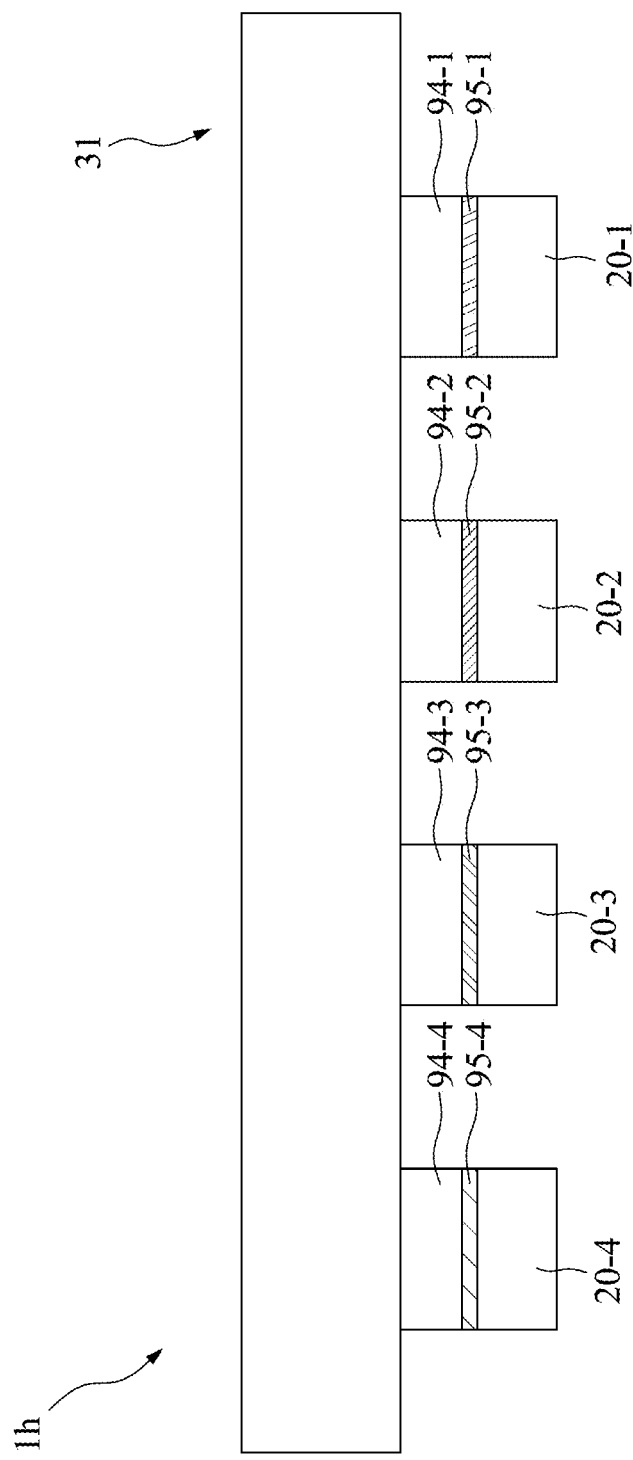
FIG. 10 is a partial top view of an optoelectronic device according to some embodiments of the present disclosure.

FIG. 10 is a partial top view of an optoelectronic device 1h according to some embodiments of the present disclosure. The optoelectronic device 1h is similar to the optoelectronic device 1g as shown in FIG. 9, with differences therebetween as follows.

The optoelectronic device 1h may include optical elements 94-1, 94-2, 94-3, and 94-4 disposed between the optoelectronic modules 20-1, 20-2, 20-3, and 20-4 as well as the waveguide 31, respectively. Each of the optical elements 94-1, 94-2, 94-3, and 94-4 may be configured to facilitate the optical communication between waveguide 31 and optoelectronic modules 20-1, 20-2, 20-3, and 20-4. The refractive index of the material of the optical elements 94-1, 94-2, 94-3, and 94-4 may be similar or identical to that of the waveguide 31. The refractive index of the material of the optical elements 94-1, 94-2, 94-3, and 94-4 may be similar or identical to that of the optoelectronic modules 20-1, 20-2, 20-3, and 20-4. The optical elements 94-1, 94-2, 94-3, and 94-4 may include, for example, silicon or other suitable materials. The optoelectronic device 1h may include wavelength filters 95-1, 95-2, 95-3, and 95-4 disposed between the optoelectronic modules 20-1, 20-2, 20-3, and 20-4 as well as the optical elements 94-1, 94-2, 94-3, and 94-4, respectively. The wavelength filters 95-1, 95-2, 95-3, and 95-4 may allow signals of different wavelengths (or bands of wavelength) to pass through so that the optoelectronic modules 20-1, 20-2, 20-3, and 20-4 may receive signals of different wavelengths.

Figure 11:
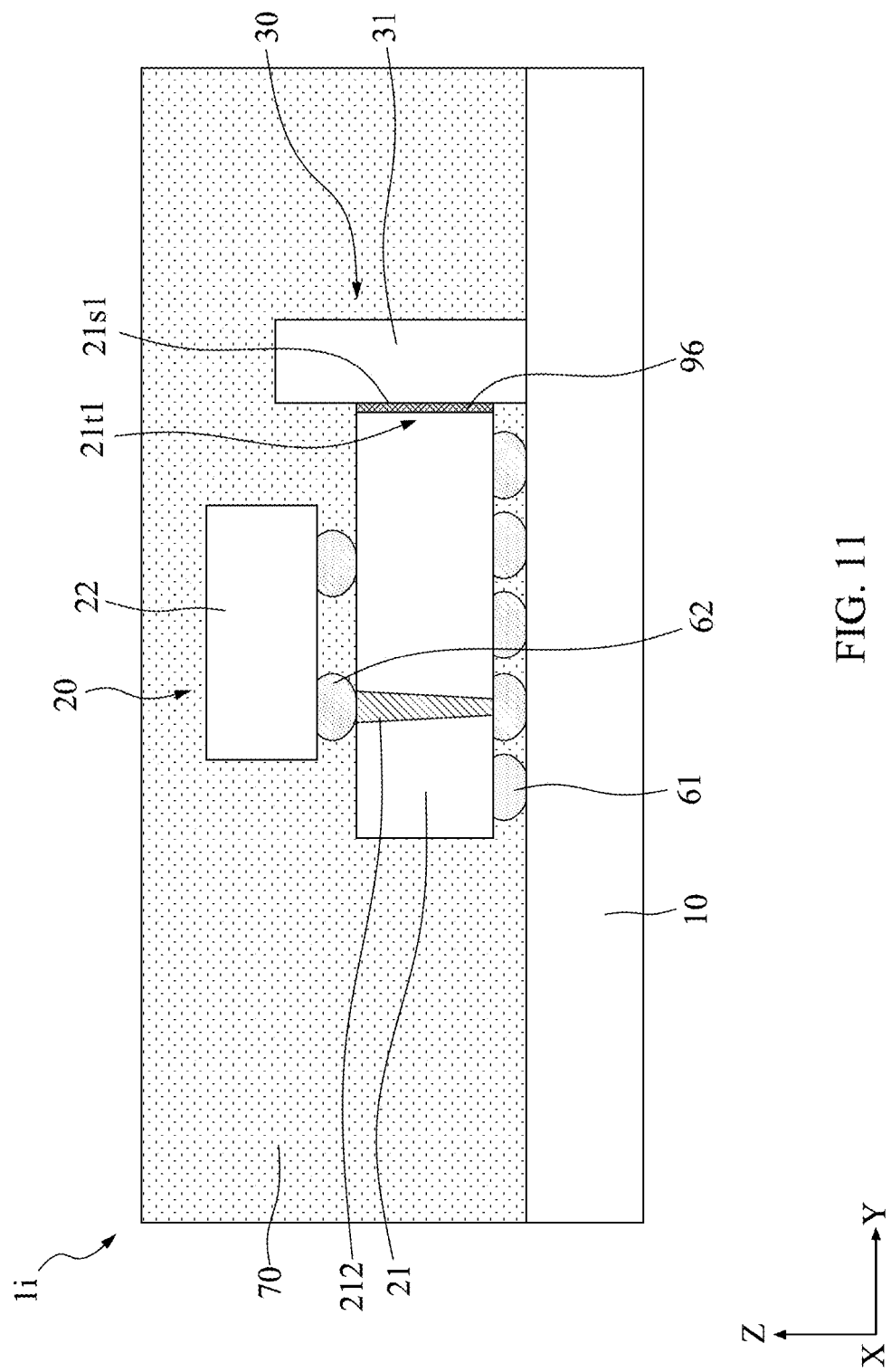
FIG. 11 is a cross-section of an optoelectronic device according to some embodiments of the present disclosure.

FIG. 11 is a cross-section of an optoelectronic device 1i according to some embodiments of the present disclosure. In some embodiments, the optoelectronic device 1i may include a filter 96 disposed between the photonic component 21 and the waveguide 31. The filter 96 may allow a signal with a specific wavelength (or band of wavelength) to pass through.

Figure 12:
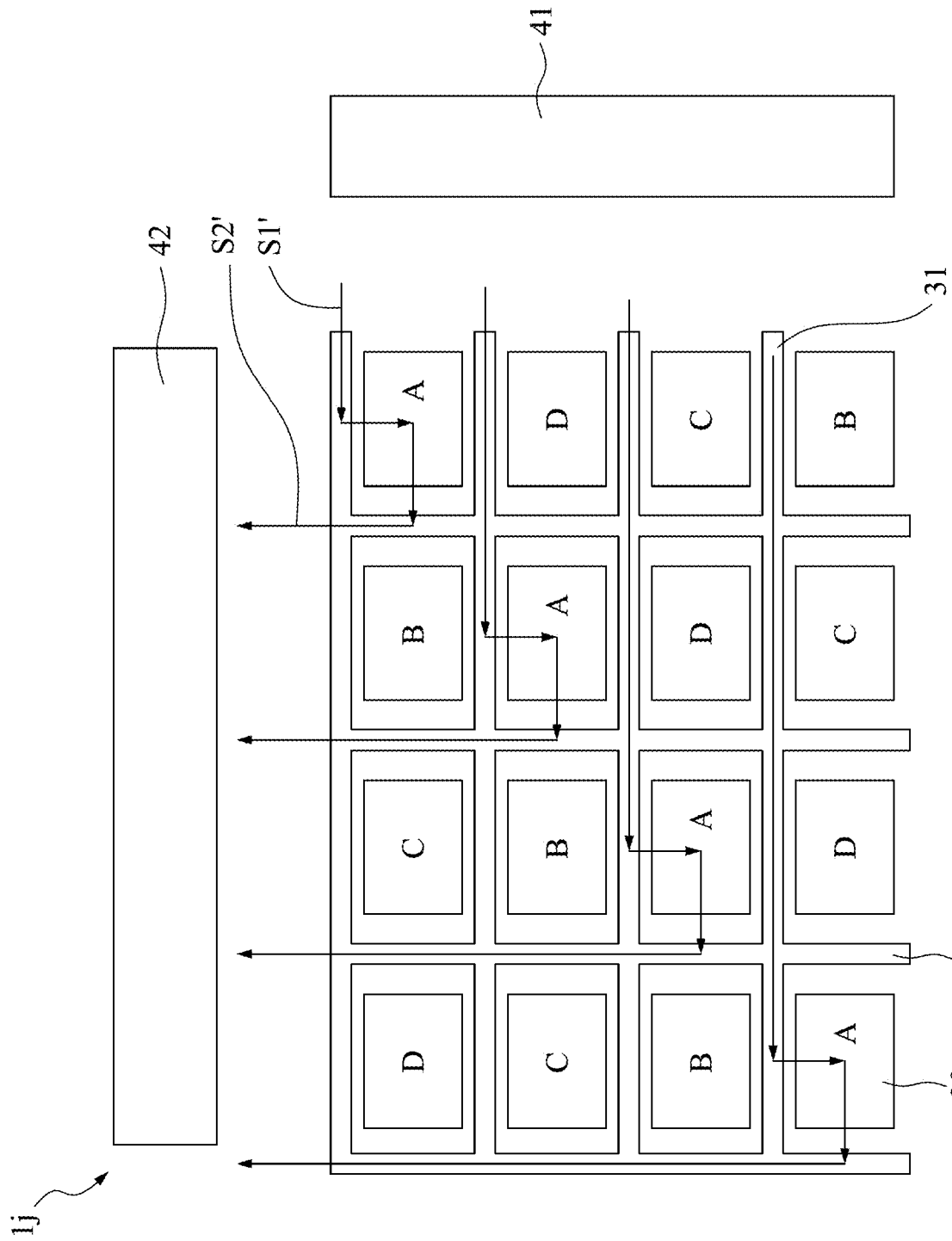
FIG. 12 is a schematic view of an operation of an optoelectronic device according to some embodiments of the present disclosure.

FIG. 12 is a schematic view of an operation of an optoelectronic device 1j according to some embodiments of the present disclosure.

The optoelectronic modules 20 may be grouped. For example, the optoelectronic modules 20 may be grouped into groups A, B, C, and D. The optoelectronic modules 20 belong to the same group may be enabled by, for example, the ASIC or other suitable ICs, concurrently. For example, the optoelectronic modules 20 of the group A may be enabled to receive or process a signal concurrently. In this condition, the optoelectronic modules 20 of groups B, C, and D may be disabled to receive or process a signal. When a plurality of signals S1' are divided or differentiated by the receiver 41, the plurality of signals S1' may be transmitted to the optoelectronic modules 20 of the group A. Signals S2', which are processed, may be transmitted to the transmitter 42 from corresponding optoelectronic modules 20 of the group A. In this embodiment, by grouping the optoelectronic modules 20, the signals may be identified by the location of the optoelectronic modules 20 which is enabled.

Figure 13:
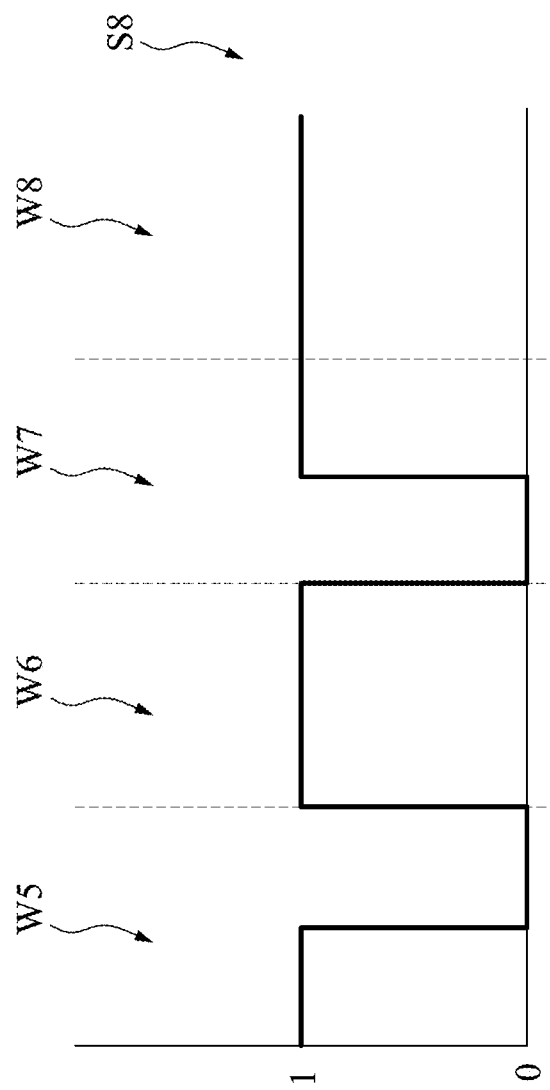
FIG. 13 is a schematic view of separated signals according to some embodiments of the present disclosure.

FIG. 13 is a schematic view of separated signals according to some embodiments of the present disclosure. As shown in FIG. 13, a signal S8 may have logic values "1," "0," "1," "1," "0," "1," "1," and "1." In some embodiments, the signal S8 may be divided into a plurality of segments by the receiver 41. In some embodiments, the signal S8 may be divided into, for example, four or more or less segments. For example, the signal S8 may be divided into signals W5, W6, W7, and W8. The signal W5 may have logic values "1" and "0." The signal W6 may have logic values "1" and "1." The signal W7 may have logic values "0" and "1." The signal W8 may have logic values "1" and "1." Each of the signals W5, W6, W7, and W8 may be processed by an optoelectronic module and then combined into a processed signal.

Figure 14:
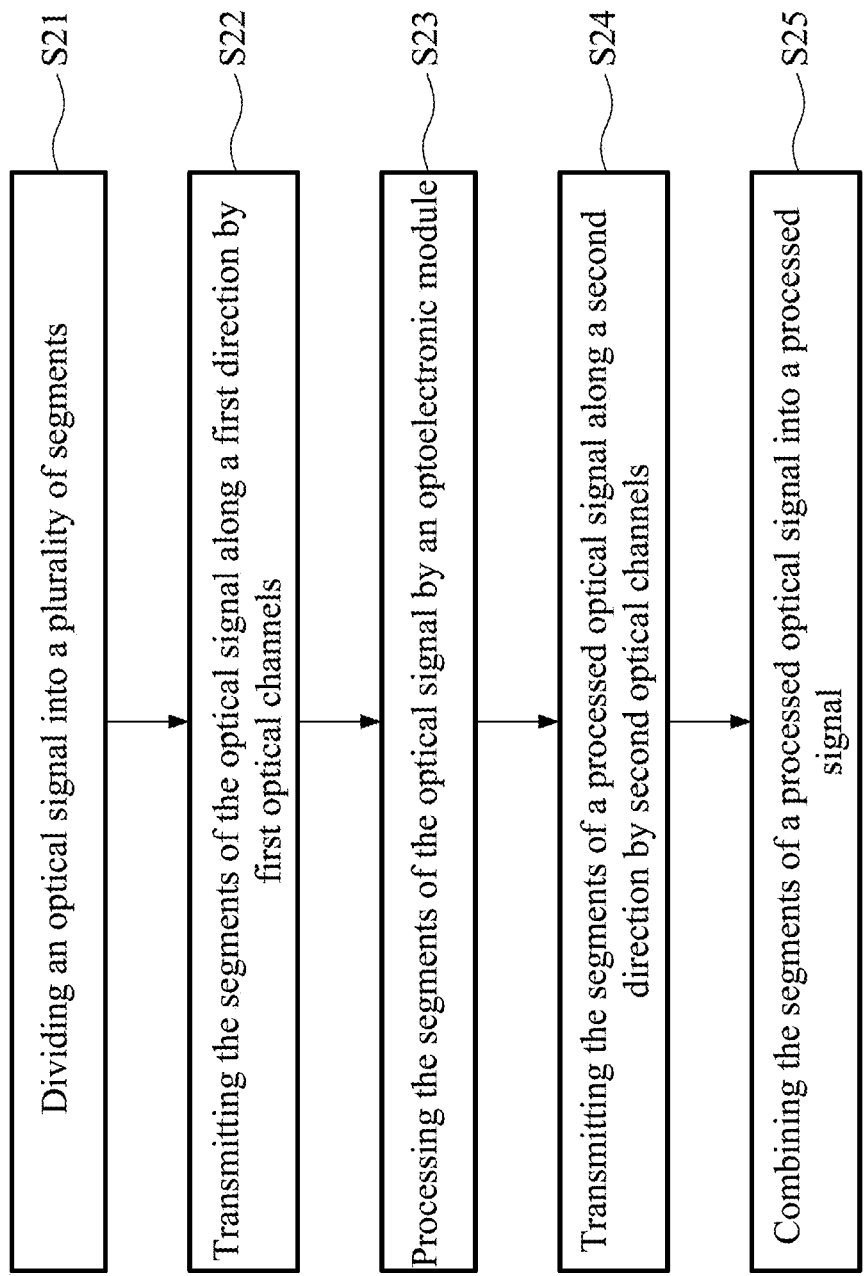
FIG. 14 is a flowchart illustrating a method of transmitting optical signals, in accordance with some embodiments of the present disclosure.

FIG. 14 is a flowchart illustrating a method 2 of transmitting optical signals, in accordance with some embodiments of the present disclosure.

The method 2 may begin with operation S21 in which an optical signal is divided into a plurality of segments.

The method 2 may continue with operation S22 in which the segments of the optical signal may be transmitted along a first direction by first optical channels.

The method 2 may continue with operation S23 in which the segments of the optical signal may be processed by an optoelectronic module.

The method 2 may continue with operation S24 in which the segments of a processed optical signal may be transmitted along a second direction by second optical channels. The second optical channel may be perpendicular to or angled with respect to the first optical channel.

The method 2 may continue with operation S25 in which the segments of processed optical signals may be combined into a processed signal.

The method 2 is merely an example, and is not intended to limit the present disclosure beyond what is explicitly recited in the claims. Additional operations can be provided before, during, or after each operation of the method 2, and some operations described can be replaced, eliminated, or reordered for additional embodiments of the method. In some embodiments, the method 2 can include further operations not depicted in FIG. 14. In some embodiments, the method 2 can include one or more operations depicted in FIG. 14. In some embodiments, the method 2 can include other operations discussed in FIG. 1 to FIG. 13.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such an arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Two surfaces can be deemed to be coplanar or substantially coplanar if displacement between the two surfaces is no greater than 5 µm, no greater than 2 µm, no greater than 1 µm, or no greater than 0.5 µm.

As used herein, the singular terms "a," "an," and "the" may include plural referents unless the context clearly dictates otherwise.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

Additionally, amounts, ratios, and other numerical values are sometimes presented herein in a range format. Such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optoelectronic device, comprising:
a plurality of first waveguides configured to receive a first plurality of optical signals;
a plurality of second waveguides configured to transmit a second plurality of optical signals, wherein the plurality of first waveguides extend substantially along a first direction and the plurality of second waveguides extend substantially along a second direction different from and non-parallel with the first direction;
an optoelectronic module having a first side and a second side different from the first side, wherein one of the plurality of first waveguides is optically coupled with the first side of the optoelectronic module;
wherein one of the plurality of second waveguides is optically coupled with the second side of the optoelectronic module, and wherein the optoelectronic module further comprises:
a photonic component optically coupled with the one of the plurality of first waveguides and the one of the plurality of second waveguides; and
a first electronic component signally coupled with the photonic component, wherein the photonic component and the first electronic component are collectively configured to convert one of the first plurality of optical signals transmitted by the one of the plurality of first waveguides to an electrical signal.

2. The optoelectronic device of claim 1, further comprising:
an encapsulant encapsulating the plurality of first waveguides and the plurality of second waveguides, wherein a refractive index of at least one of the plurality of first waveguides is greater than a refractive index of the encapsulant.

3. The optoelectronic device of claim 1, further comprising:
a cladding layer encapsulating the plurality of first waveguides and the plurality of second waveguides; and
a transparent element encapsulating the cladding layer.

4. The optoelectronic device of claim 1, further comprising:
a carrier electrically connected to the optoelectronic module,
wherein the photonic component comprises a through-via configured to electrically connect the first electronic component and the carrier.

5. The optoelectronic device of claim 1, further comprising:
a second electronic component configured to process a second electrical signal from the optoelectronic module.

6. The optoelectronic device of claim 1, wherein the first side abuts the second side.

7. An optoelectronic device, comprising:
a plurality of first waveguides configured to receive a first plurality of optical signals; and
a plurality of second waveguides configured to transmit a second plurality of optical signals, wherein the plurality of first waveguides extend substantially along a first direction and the plurality of second waveguides extend substantially along a second direction different from and non-parallel with the first direction;
a receiver configured to transmit the first plurality of optical signals and the second plurality of optical signals;
a first optoelectronic module optically coupled with the receiver and configured to process one of the first plurality of optical signals; and
a second optoelectronic module optically coupled with the receiver and configured to process one of the second plurality of optical signals,
wherein one of the plurality of first waveguides is optically coupled with the receiver, the first optoelectronic module and the second optoelectronic module,
and wherein a wavelength of the first plurality of optical signals is different from a wavelength of the second plurality of optical signals, and a distance between the first optoelectronic module and the receiver is different from a distance between the second optoelectronic module and the receiver.

8. The optoelectronic device of claim 7, further comprising:
an optical element disposed within the one of the plurality of first waveguides, wherein the optical element is configured to guide the one of the first plurality of optical signals to the first optoelectronic module and allow the one of the second plurality of optical signals to pass through.

9. The optoelectronic device of claim 7, further comprising:
an optical element disposed between the one of the plurality of first waveguides and the first optoelectronic module, wherein the optical element is configured to guide the one of the first plurality of optical signals to the first optoelectronic module.

10. The optoelectronic device of claim 7, wherein the first optoelectronic module comprises a photonic component optically coupled with the one of the plurality of first waveguides and a wavelength filter disposed within the photonic component and the one of the plurality of first waveguides.

11. The optoelectronic device of claim 7, wherein
the plurality of first waveguides are optically coupled with the receiver and the first optoelectronic module, and
the plurality of second waveguides are optically coupled with the receiver and the second optoelectronic module.

12. The optoelectronic device of claim 7, further comprising:
a transmitter configured to collect optical signals processed by the first optoelectronic module and the second optoelectronic module.

* * * * *